US012560201B2

(12) United States Patent
Cheng et al.

(10) Patent No.: US 12,560,201 B2
(45) Date of Patent: Feb. 24, 2026

(54) HOLDER FOR SELF-ALIGNING ROLLER BEARING AND SELF-ALIGNING ROLLER BEARING

(71) Applicant: Schaeffler Technologies AG & Co. KG, Herzogenaurach (DE)

(72) Inventors: Tao Cheng, Shanghai (CN); Jixuan Liu, Shanghai (CN); Yaofeng Lv, Shanghai (CN); Rong Gao, Jiang Su (CN); Houqiao Xia, Shanghai (CN); Yunsheng Huang, Kunshan (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 114 days.

(21) Appl. No.: 18/568,332

(22) PCT Filed: Jun. 11, 2021

(86) PCT No.: PCT/CN2021/099686
§ 371 (c)(1),
(2) Date: Dec. 8, 2023

(87) PCT Pub. No.: WO2022/257110
PCT Pub. Date: Dec. 15, 2022

(65) Prior Publication Data
US 2024/0271661 A1    Aug. 15, 2024

(51) Int. Cl.
*F16C 33/49* (2006.01)
*F16C 23/08* (2006.01)
(Continued)

(52) U.S. Cl.
CPC .......... *F16C 33/49* (2013.01); *F16C 33/4605* (2013.01); *F16C 33/48* (2013.01);
(Continued)

(58) Field of Classification Search
CPC ...... F16C 33/4605; F16C 33/48; F16C 33/49; F16C 33/494; F16C 33/495; F16C 33/497; F16C 33/498
See application file for complete search history.

(56) References Cited

U.S. PATENT DOCUMENTS 3,290,102 A * 12/1966 Eriksson .................. B24B 3/36
384/577
4,033,646 A * 7/1977 Lang .................. F16C 33/6651
384/406
4,714,358 A * 12/1987 Bayer ................. F16C 33/4623
384/571

FOREIGN PATENT DOCUMENTS

CN    203412946    1/2014
CN    203641274    6/2014
(Continued)

*Primary Examiner* — James Pilkington
(74) *Attorney, Agent, or Firm* — Volpe Koenig

(57) ABSTRACT

A holder for a self-aligning roller bearing, having a central annular part with lintels fixed on side surfaces thereof in an axial direction and protruding parts which protrude closer to the outer sides in a radial direction than the lintels. The holder includes reinforcement parts fixed to the central annular part and the lintels on outer sides of the lintels in the radial direction and on outer sides of the protruding parts in the axial direction. In cross sections cut out along the axial direction and radial direction, at least a part of a contour line of outer side surfaces of the reinforcement parts in the axial direction extends inwardly in the radial direction while extending toward outwardly in the axial direction. A self-aligning roller bearing having the holder with improved connection strength of connection parts between the lintels and the central annular part prolongs bearing service life.

15 Claims, 9 Drawing Sheets

(51) Int. Cl.
   *F16C 33/46*        (2006.01)
   *F16C 33/48*        (2006.01)
   *F16C 19/38*        (2006.01)

(52) U.S. Cl.
   CPC ............ *F16C 33/497* (2013.01); *F16C 19/38* (2013.01); *F16C 23/086* (2013.01)

(56)              References Cited

FOREIGN PATENT DOCUMENTS

| JP | 2001221237 A | 8/2001 |
| JP | 2001304271 | 10/2001 |
| JP | 2003194067 | 7/2003 |
| JP | 2008185172 | 8/2008 |
| JP | 2019173919 | 10/2019 |

* cited by examiner

HOLDER FOR SELF-ALIGNING ROLLER BEARING AND SELF-ALIGNING ROLLER BEARING

CROSS-REFERENCE TO RELATED APPLICATIONS

This application is a 371 National Phase of International Application No. PCT/CN2021/099686, filed Jun. 11, 2021, which is incorporated herein by reference as if fully set forth.

TECHNICAL FIELD

The present application relates to the field of bearings, and in particular to a holder for a self-aligning roller bearing and a self-aligning roller bearing comprising the holder.

BACKGROUND ART

Since a shaft in a gearbox of a rolling mill is prone to deflection, a self-aligning roller bearing having a certain self-aligning function is often selected to support the shaft. As shown in FIG. 1, a typical self-aligning roller bearing comprises an outer ring 10, an inner ring 20, rolling elements 30 and a holder 40. The outer ring 10 and the inner ring 20 can rotate relative to each other. An outer raceway for two rows of rolling elements 30 to roll is formed on the outer ring 10. Two inner raceways for the two rows of rolling elements 30 to roll respectively are formed on the inner ring 20. The rolling elements 30 are divided to be in two rows and are respectively installed in pockets between lintels of the holder 40. The holder 40 holds the rolling elements 30 between the outer ring 10 and the inner ring 20 to limit the two rows of rolling elements 30. A central annular part of the holder 40 protrudes toward an outer side in the radial direction not more than the lintels, and there is a larger gap between the central annular part and the outer ring. The self-aligning roller bearing belongs to a self-aligning roller bearing in which the holder is guided by the rolling elements.

When the self-aligning roller bearing shown in FIG. 1 is applied to the gearbox of the rolling mill, the gearbox of the rolling mill will make the self-aligning roller bearing bear an obvious instantaneous circumferential impact in the process that the rolling mill performs pressing and rolling, so that a certain circumferential impact force is generated between the rolling elements 30 and the holder 40 inside the self-aligning roller bearing. Such circumferential impact force produces a larger impact load on the lintels of the holder 40, so connection parts, between the lintels and the central annular part, of the holder 40 are prone to breakage, causing damage to the self-aligning roller bearing.

SUMMARY

The objectives of the present application are to overcome or at least reduce the shortcomings in the prior art above, and provide a novel holder for a self-aligning roller bearing, which can reduce the risk of breakage of lintels of the holder under the circumstance of a circumferential impact load from rolling elements. Further provided is a self-aligning roller bearing comprising the holder above, which has the same effect.

In order to achieve the above-mentioned objectives, the present application adopts the following technical solutions.

The present application provides a holder for a self-aligning roller bearing. The holder is formed as a ring shape and comprises a central annular part and a plurality of lintels fixed together, the central annular part extends continuously over an entire circumference along a circumferential direction of the holder, each of the lintels extends a predetermined length along an axial direction of the holder, and the lintels are fixed on two side surfaces of the central annular part in an axial direction; on any side of the central annular part in the axial direction, the plurality of the lintels are arranged at intervals in the circumferential direction so that pockets in which rolling elements of the self-aligning roller bearing are installed are formed between every two lintels adjacent in the circumferential direction;

the central annular part comprises protruding parts which protrude to positions that are closer to outer sides in a radial direction of the holder than the lintels, the holder further comprises reinforcement parts fixed to the central annular part and the lintels, and the reinforcement parts are located on outer sides of the lintels in the radial direction and are located on outer sides of the protruding parts in the axial direction;

at parts of the holder where the lintels are disposed, in cross sections cut out along the axial direction and radial direction, at least a part of a contour line of outer side surfaces of the reinforcement parts in the axial direction extends toward an inner side in the radial direction while extending toward an outer side in the axial direction.

Preferably, the contour line of the outer side surfaces in the axial direction extends from an outer circumferential surface of the central annular part to outer side surfaces of the lintels in the radial direction.

More preferably, in the process that the outer side surfaces in the axial direction extend from the lintels toward the central annular part, a width of the outer side surfaces in the axial direction in the circumferential direction gradually increases.

More preferably, a number of the lintels on one side of the central annular part in the axial direction is equal to that of the lintels on the other side of the central annular part in the axial direction, and the lintels on one side of the central annular part in the axial direction are aligned with the lintels on the other side of the central annular part in the axial direction in the circumferential direction.

More preferably, on an outer circumferential portion of the holder, two material removal sections are formed on the holder, and the two material removal sections are deflected by 180 degrees relative to a circle center of the holder.

More preferably, a center position of each of the material removal sections is located between two of the lintels adjacent in the circumferential direction.

More preferably, in a front view viewed along the axial direction, contour lines of parts of the holder where the material removal sections are formed are straight lines or curves protruding toward the outer side in the radial direction.

More preferably, at the parts of the holder where the lintels are disposed, in cross sections which are cut out along the radial direction of rolling elements and are perpendicular to the axial direction of the rolling elements, contour lines of side surfaces of the reinforcement parts in the circumferential direction are straight lines or curves.

The present application further provides a self-aligning roller bearing as follows, comprising a holder for a self-aligning roller bearing according to any one of the foregoing technical solutions.

Preferably, the self-aligning roller bearing further comprises an outer ring, an inner ring and a plurality of rolling elements, the rolling elements are installed in pockets of the holder and held between the outer ring and the inner ring by the holder, and an outer circumferential surface of the central annular part of the holder is matched with a raceway of the outer ring in shape.

More preferably, the lintels and the reinforcement parts are configured so that the rolling elements can only make contact with the lintels and be spaced apart from the reinforcement parts in the working process of the rolling elements installed in the pockets.

More preferably, side surfaces of the lintels in the circumferential direction are formed as shapes matched with contours of the rolling elements.

In any one of the cross sections which are cut out along the radial direction of the rolling elements and are perpendicular to the axial direction of the rolling elements, if it supposed that a circle center of the cross sections of the rolling elements is O, an outermost point of the contour line in the radial direction of the side surfaces of the lintels in the circumferential direction is P and any point on the contour line of the side surfaces of the reinforcement parts in the circumferential direction corresponding to the lintels is Q, it is satisfied that a distance between point O and point Q is always greater than a distance between point O and point P.

By adopting the above technical solution, the present application provides a novel holder for a self-aligning roller bearing and a self-aligning roller bearing comprising the same. The holder is formed as a ring shape and comprises a central annular part and lintels fixed together. The central annular part continuously extends over an entire circumference along a circumferential direction of the holder. Each of the lintels extends a predetermined length along an axial direction of the holder, and the lintels are fixed on two side surfaces of the central annular part in the axial direction. On any side of the central annular part in the axial direction, the plurality of lintels are arranged at intervals in the circumferential direction so that pockets where rolling elements of the self-aligning roller bearing are installed are formed between every two of lintels adjacent in the circumferential direction. Further, the central annular part comprises protruding parts which protrude to the positions that are closer to the outer sides in the radial direction of the holder than the lintels. The holder further comprises reinforcement parts fixed to the central annular part and the lintels, and the reinforcement parts are located on the outer sides of the lintels in the radial direction and are located on the outer sides of the protruding parts in the axial direction. At the parts of the holder where the lintels are disposed, in cross sections cut out along the axial direction and radial direction, at least a part of a contour line of the outer side surfaces of the reinforcement parts in the axial direction extends toward the inner side in the radial direction while extending toward the outer side in the axial direction.

Thus, for the self-aligning roller bearing in which central annular part has a shape protruding relative to the lintels (for example, a self-aligning roller bearing in which a holder is guided by an outer ring), the reinforcement parts for enhancing the connection strength of the connection parts between the lintels and the central annular part are formed at the positions on the outer sides of the connection parts of the lintels connected to the central annular part in the radial direction and the outer side of the central annular part in the axial direction. Therefore, the connection strength of the connection parts between the lintels and the central annular part is effectively improved, the risk of breakage of the lintels under the circumstance of a circumferential impact load from the rolling elements can be significantly reduced, and the service life of the self-aligning roller bearing can be effectively prolonged.

DETAILED DESCRIPTION

Figure 1:
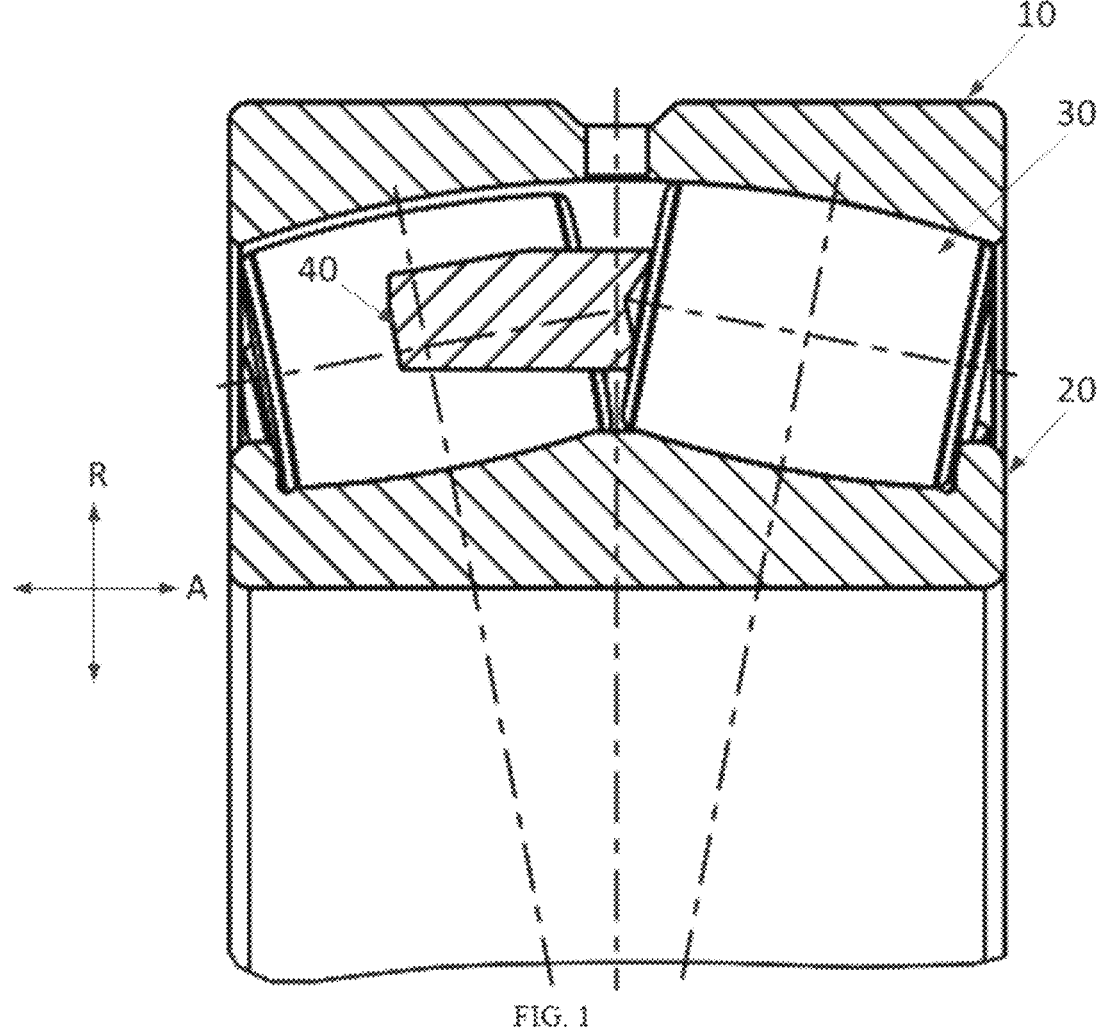
FIG. 1 is a partial cross-sectional schematic diagram of a typical self-aligning roller bearing.

Exemplary embodiments of the present application will be described below with reference to the accompanying drawings. It should be understood that these specific descriptions are only used to teach those skilled in the art how to implement the present application, and are neither intended to be exhaustive of all feasible modes of the present application nor to limit the scope of the present application.

It should be noted that, unless otherwise specified, in the present application, "axial direction", "radial direction" and "circumferential direction" refer to the axial direction, radial direction and circumferential direction of a self-aligning roller bearing (holder), respectively, wherein "outer side in the axial direction" refers to the side away from a centerline in the axial direction of the holder, and "inner side in the axial direction" refers to the side close to the centerline in the axial direction of the holder. In addition, in the present application, "axial direction of rolling elements" and "radial direction of rolling elements" refer to the axial direction and radial direction of rolling elements, respectively, which are different from the aforementioned "axial direction" and "radial direction".

The structure of the self-aligning roller bearing according to the first embodiment of the present application will first be described below with reference to the accompanying drawings.

As shown in FIG. 2A to FIG. 2D, the self-aligning roller bearing according to the first embodiment of the present application comprises an outer ring 1, an inner ring 2, a plurality of rolling elements 3 and a holder 4 assembled together. The self-aligning roller bearing has a self-aligning function.

In the present embodiment, the outer ring 1 and the inner ring 2 can rotate relative to each other. An outer raceway for two rows of rolling elements 3 to roll in is formed on the outer ring 1. In the sectional view shown in FIG. 2A, a contour line of the outer raceway is formed as an arc shape as a whole. Different from the outer ring 1, two inner raceways for the two rows of rolling elements 3 to roll respectively are formed on the inner ring 2, and one inner raceway corresponds to one row of rolling elements 3.

In the present embodiment, the plurality of rolling elements 3 are installed in pockets between lintels 42 of the holder 4 and held between the outer ring 1 and the inner ring 2 by the holder 4. Each rolling element 3 is a cylinder of which a generatrix is in a curve shape. The shape of the generatrix of the cylinder is matched with shapes of the outer raceway and the corresponding inner raceway so that the rolling elements 3 can rotate smoothly between the outer ring 1 and the inner ring 2.

In the present embodiment, the holder 4 as a whole is formed as a ring shape. Specifically, the holder 4 comprises a central annular part 41, the lintels 42 and reinforcement parts 43 that are integrally formed. The central annular part 41 extends continuously over an entire circumference along a circumferential direction C of the holder 4. Each of the lintels 42 extends by a predetermined length along an axial direction A of the holder 4, and the lintels 42 are fixed on the central annular part 41 from two side surfaces in an axial direction. A number of the lintels 42 on one side of the central annular part 41 in the axial direction is equal to that of the lintels 42 on the other side of the central annular part 41 in the axial direction, and the lintels 42 on one side of the central annular part 41 in the axial direction are aligned with the lintels 42 on the other side of the central annular part 41 in the axial direction in the circumferential direction C. On any side of the central annular part 41 in the axial direction, the plurality of lintels 42 are arranged at intervals in the circumferential direction C so that the pockets where the rolling elements 3 of the self-aligning roller bearing are installed are formed between every two of the lintels 42 adjacent in the circumferential direction C. Shapes of the pockets and sizes of the pockets in the circumferential direction C are defined by side surfaces of the lintels 42 in the circumferential direction. Further, the lintels 42 comprise root parts 421 connected to the central annular part 41. The central annular part 41 comprises protruding parts 411 which protrude to positions that are closer to the outer sides in a radial direction R of the holder 4 than the root parts 421, outer circumferential surfaces 41s1 of the protruding parts 411 (outer circumferential surfaces 41s1 of the central annular part 41) are matched with the outer raceway of the outer ring 1 in shape (i.e., in the sectional view shown in FIG. 2A, contour lines of the outer circumferential surfaces 41s1 of the protruding parts 411 and a contour line of the outer raceway of the outer ring 1 are circular arcs with radii of curvature approximately equal), thereby enabling the holder 4 to be guided by the outer ring.

Figure 2A:
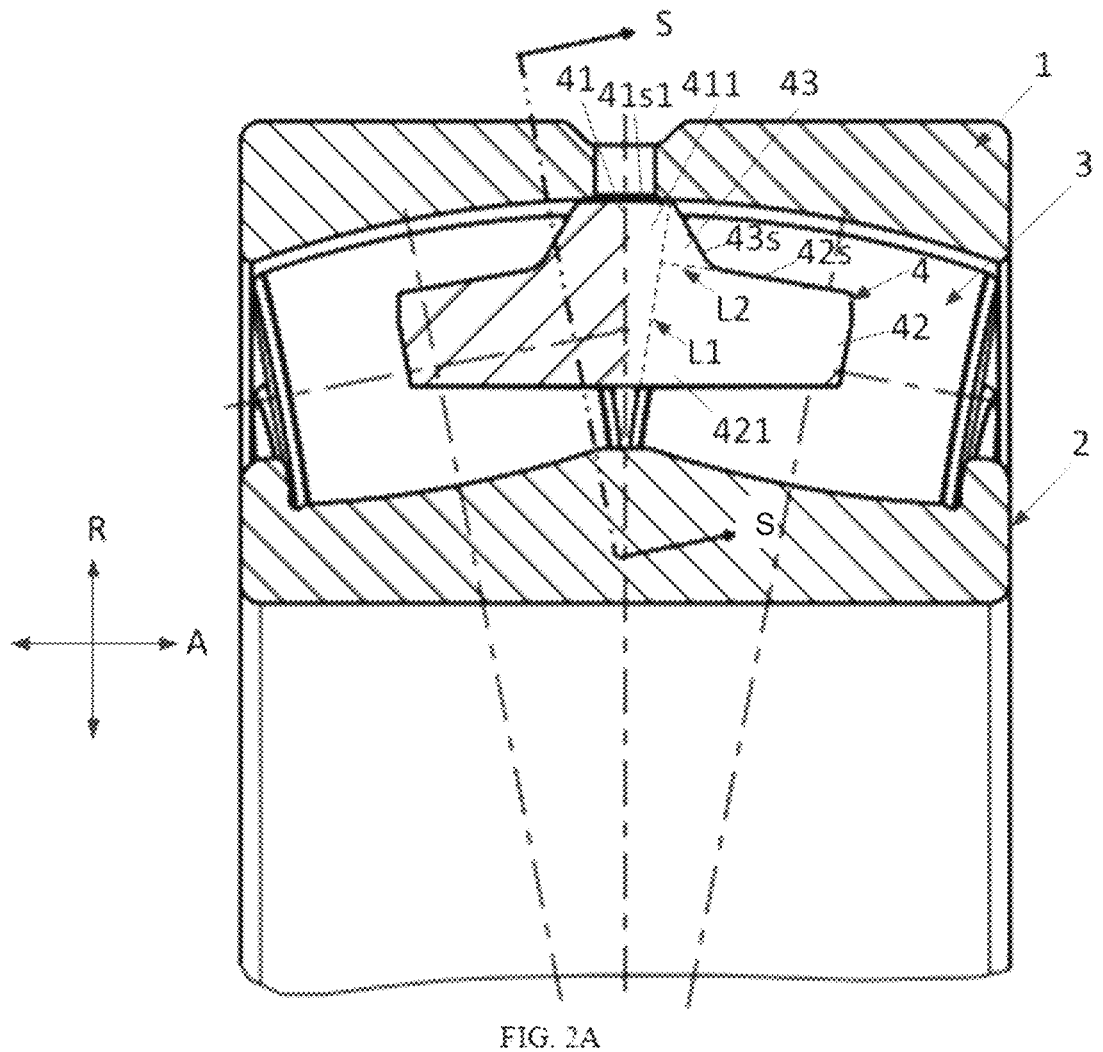
FIG. 2A is a partial cross-sectional schematic diagram of a self-aligning roller bearing according to a first embodiment of the present application, which is a cross-sectional schematic diagram of the self-aligning roller bearing cut out along an axial direction and radial direction thereof. In this schematic diagram, for the convenience of explanation and understanding, part of a section line of a holder is omitted and all parts of the holder are divided by dotted lines.

The reinforcement parts 43 are located on outer sides of the root parts 421 in the radial direction and outer sides of the protruding parts 411 in the axial direction, i.e., the reinforcement parts 43 are located at connection parts between the lintels 42 and the central annular part 41 to be used for enhancing the structural strength of the connection parts. The outer side surfaces 43s of the reinforcement parts 43 in the axial direction extend from the outer circumferential surfaces 41s1 of the central annular part 41 to the outer side surfaces (or outer circumferential surfaces) 42s of the lintels 42 in the radial direction. As shown in FIG. 2A, at parts of the holder 4 where the lintels 42 are disposed, in the cross sections cut out along the axial direction A and radial direction R, the contour line of the outer side surfaces 43s of the reinforcement parts 43 in the axial direction extends toward the inner side in the radial direction while extending toward the outer side in the axial direction. In this way, it can be ensured that the reinforcement parts 43 have a certain thickness to reliably enhance the structural strength of the connection parts. In the process that the outer side surfaces 43s of the reinforcement parts 43 in the axial direction extend from the lintels 42 toward the central annular part 41, a width of the outer side surfaces 42s in the radial direction in the circumferential direction C gradually increases. In this way, it can be ensured that the reinforcement parts 43 have an enough width to reliably enhance the structural strength of the above-mentioned connection parts.

Figure 2B:
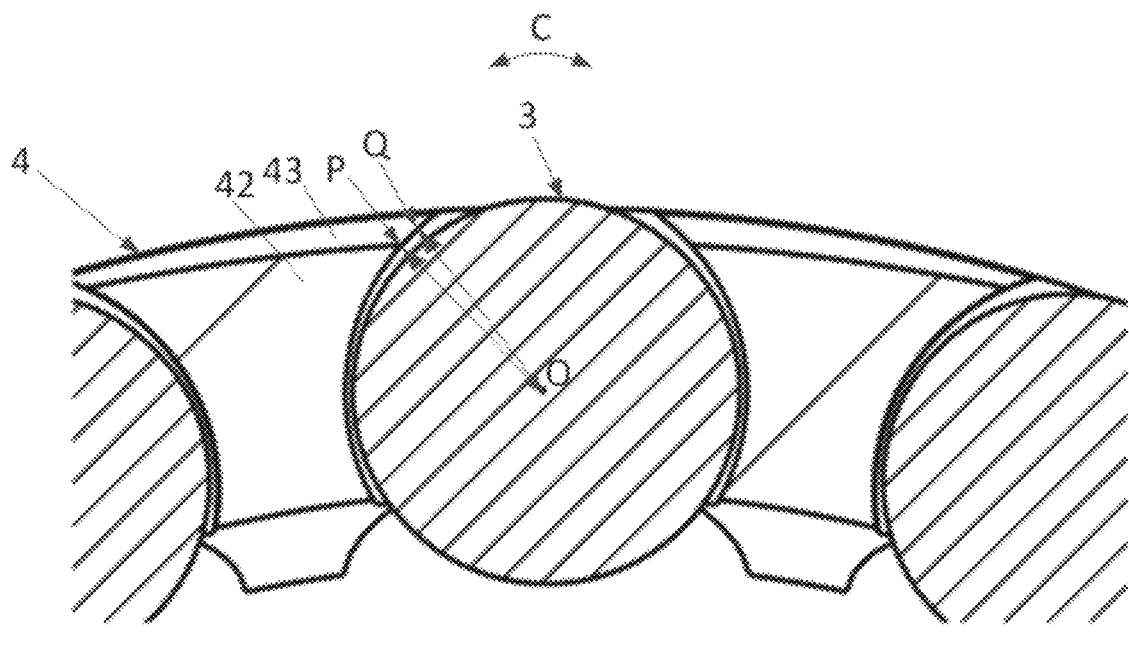
FIG. 2B is a partial cross-sectional schematic diagram of the self-aligning roller bearing in FIG. 2A cut out along a line S-S, which is a cross-sectional schematic diagram of the self-aligning roller bearing which is cut out along a radial direction of rolling elements and is perpendicular to an axial direction of the rolling elements.

Since the reinforcement parts 43 have the above-mentioned structure and shape design, besides the lintels 42 surrounding a part of surfaces of the rolling elements 3, the reinforcement parts 43 also surround a part of the surfaces of the rolling elements 3. However, in the working process of the self-aligning roller bearing, in order to prevent wear caused by friction between the reinforcement parts 43 and the rolling elements 3, the lintels 42 and the reinforcement parts 43 are configured so that the rolling elements 3 only make contact with the side surfaces of the lintels 42 in the circumferential direction but not make contact with the side surfaces of the reinforcement parts 43 in the circumferential direction in the working process of the rolling elements mounted in the pockets. Therefore, it is preferable to satisfy the following conditions. The side surfaces of the lintels 42 in the circumferential direction are formed as shapes matched with contours of the rolling elements 3. As shown in FIG. 2B, in any one of the cross sections which are cut out along the radial direction of the rolling elements and are perpendicular to the axial direction of the rolling elements, contour lines of side surfaces of the reinforcement parts 43 in the circumferential direction are curves. Further, in any one of the above-mentioned cross sections, if it supposed that a circle center of the cross sections of the rolling elements 3 is O, an outermost point of the contour line in the radial direction of the side surfaces of the lintels 42 in the circumferential direction is P and any point on the contour line of the side surfaces of the reinforcement parts 43 in the circumferential direction corresponding to the lintels 42 is Q, a distance between point O and point Q is always greater than a distance between point O and point P. In this way, even if the rolling elements 3 run in the radial direction and/or circumferential direction, the reinforcement parts 43 will not make contact with the rolling elements 3 to cause wear.

Figure 2C:
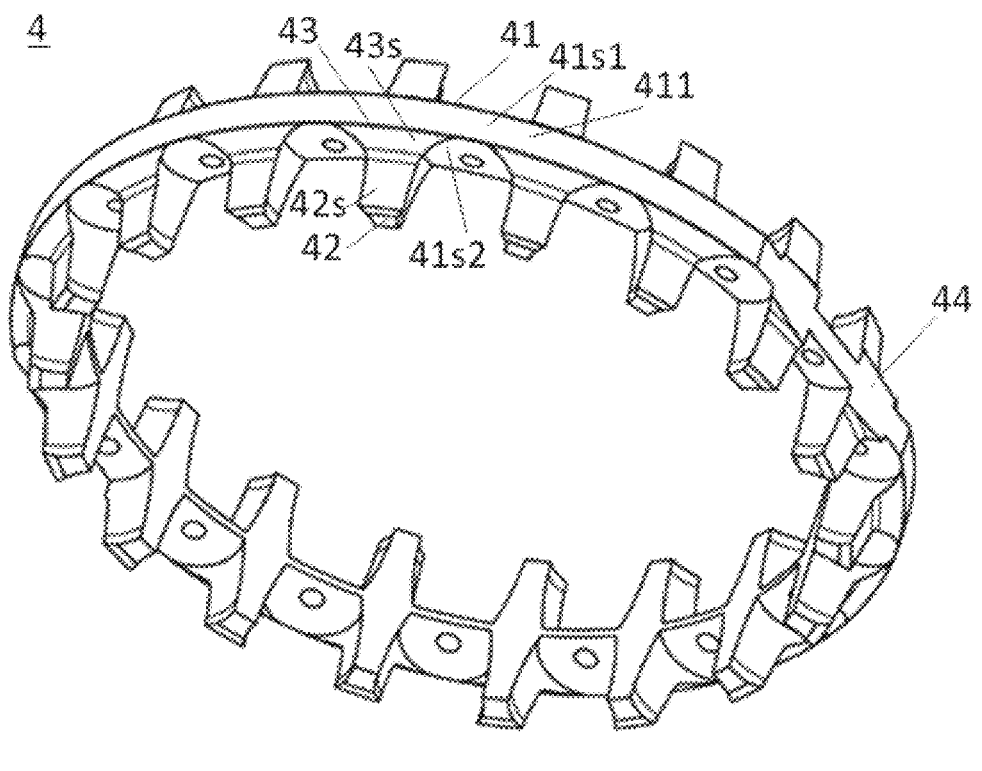
FIG. 2C is a three-dimensional schematic diagram of the holder of the self-aligning roller bearing in FIG. 2A.
Figure 2D:
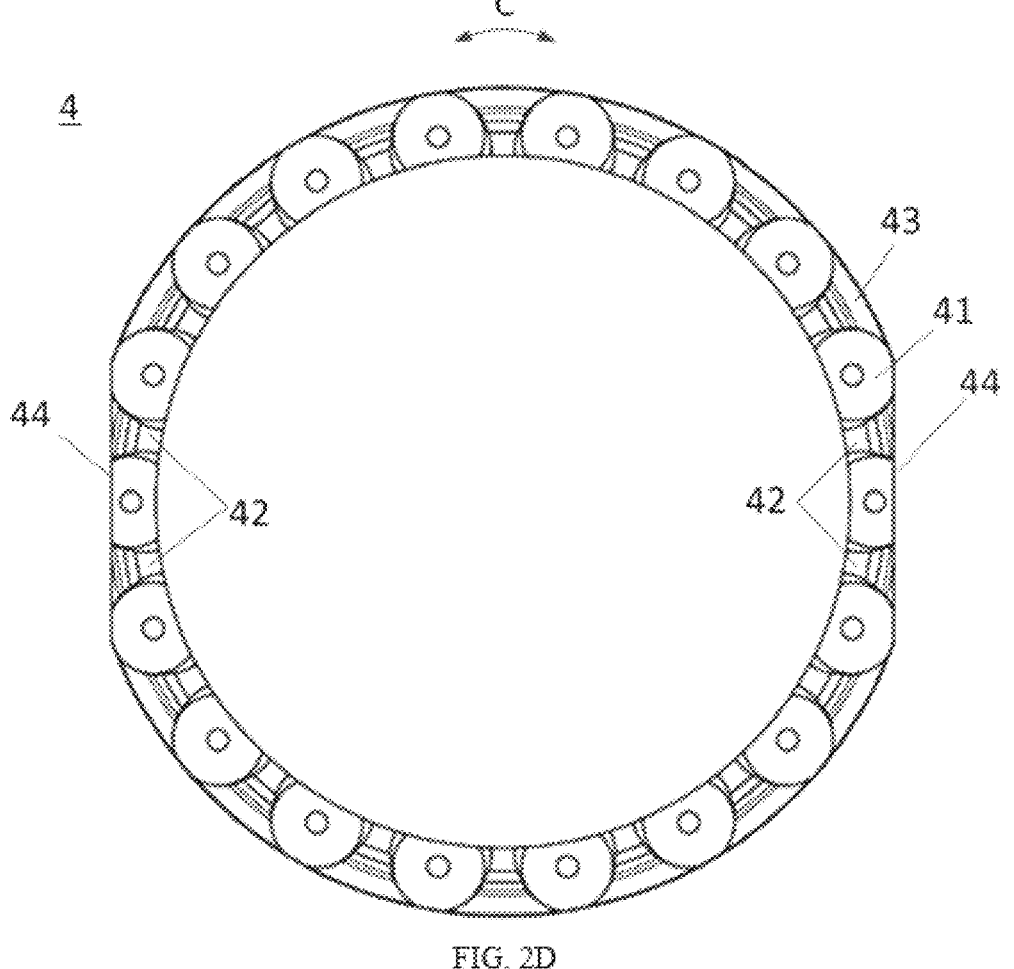
FIG. 2D is a schematic front view of the holder in FIG. 2B.

Further, as shown in FIG. 2C and FIG. 2D, on an outer circumferential portion of the holder 4, two material removal sections 44 are formed on the holder 4. The two material removal sections 44 are deflected by 180 degrees relative to a circle center of the holder 4 to facilitate the assembling of the self-aligning roller bearing by utilizing the two material removal sections 44. The central positions of the two material removal sections 44 are located between two adjacent lintels 42, thereby minimizing the adverse effects of the material removal sections 44 on the strength of the lintels 42 and the reinforcement parts 43 of the holder 4. As shown in FIG. 2D, in the front view of the holder 4 viewed along the axial direction A, contour lines of parts of the holder 4 where the material removal sections 44 are formed are straight lines.

The structure of a self-aligning roller bearing according to a second embodiment of the present application is described below with reference to the accompanying drawings.

The basic structure of the self-aligning roller bearing according to the second embodiment of the present application is roughly the same as the basic structure of the self-aligning roller bearing according to the first embodiment of the present application, and the differences between them will be described below.

Figure 3A:
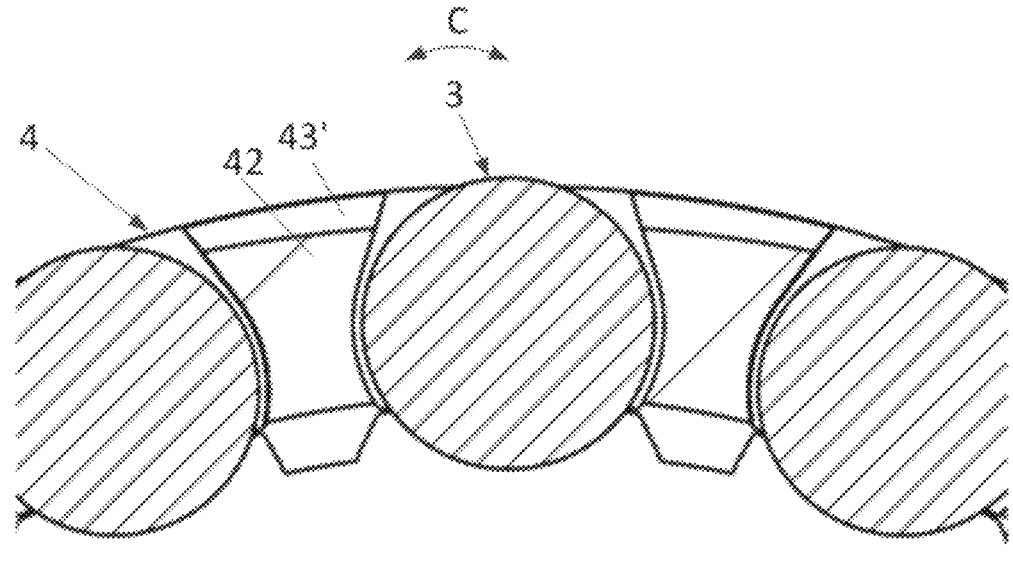
FIG. 3A is a partial cross-sectional schematic diagram of a self-aligning roller bearing according to a second embodiment of the present application, which is a cross-sectional schematic diagram of the self-aligning roller bearing which is cut out along the radial direction of rolling elements and is perpendicular to the axial direction of the rolling elements.
Figure 3B:
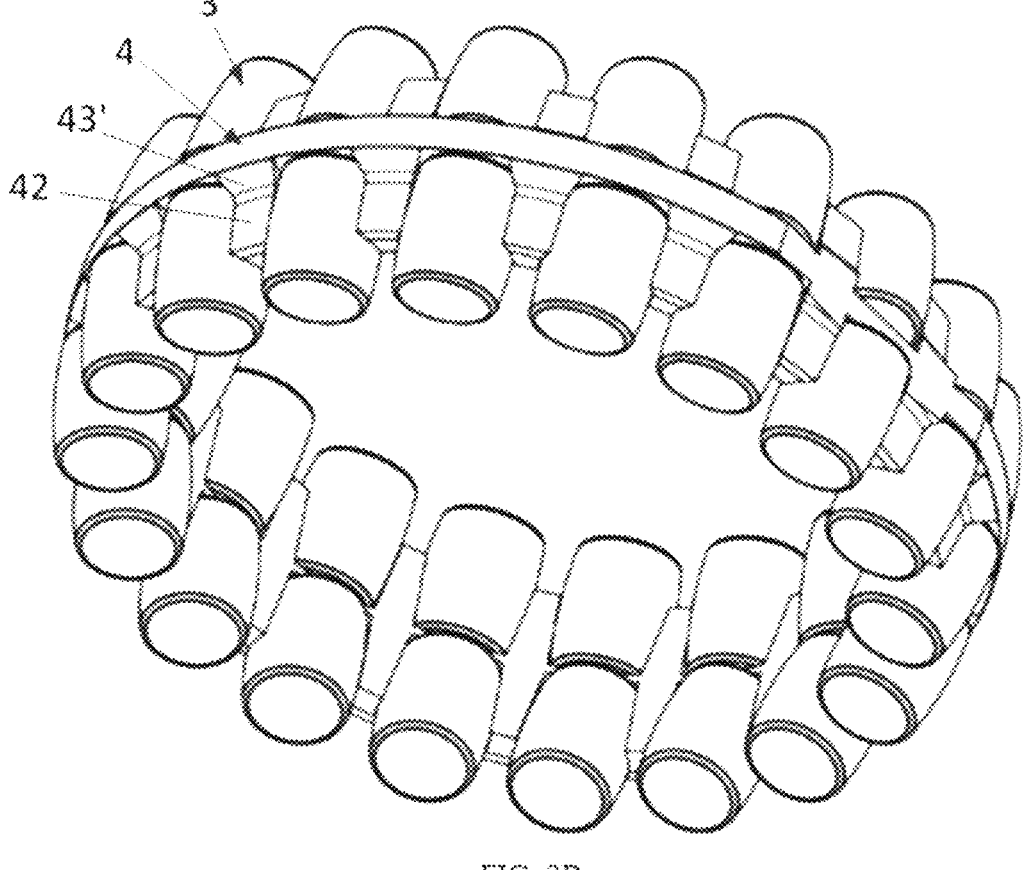
FIG. 3B is a three-dimensional schematic diagram of a partial structure, comprising the holder and the rolling elements, of the self-aligning roller bearing in FIG. 3A.

As shown in FIG. 3A and FIG. 3B, in any one of cross sections which are cut out along the radial direction of rolling elements and are perpendicular to the axial direction of the rolling elements, contour lines of side surfaces of the reinforcement parts 43' in the circumferential direction are straight lines rather than the curves in the first embodiment. In this way, the same technical effect as that of the reinforcement parts 43 in the first embodiment can also be achieved, and at the same time, it can be further ensured that the reinforcement parts 43' will not make undesired contact with the rolling elements 3.

The structure of a self-aligning roller bearing according to a third embodiment of the present application will be described below with reference to the accompanying drawings.

The basic structure of the self-aligning roller bearing according to the third embodiment of the present application is roughly the same as the basic structure of the self-aligning roller bearing according to the first embodiment of the present application, and the differences between them will be described below.

Figure 4:
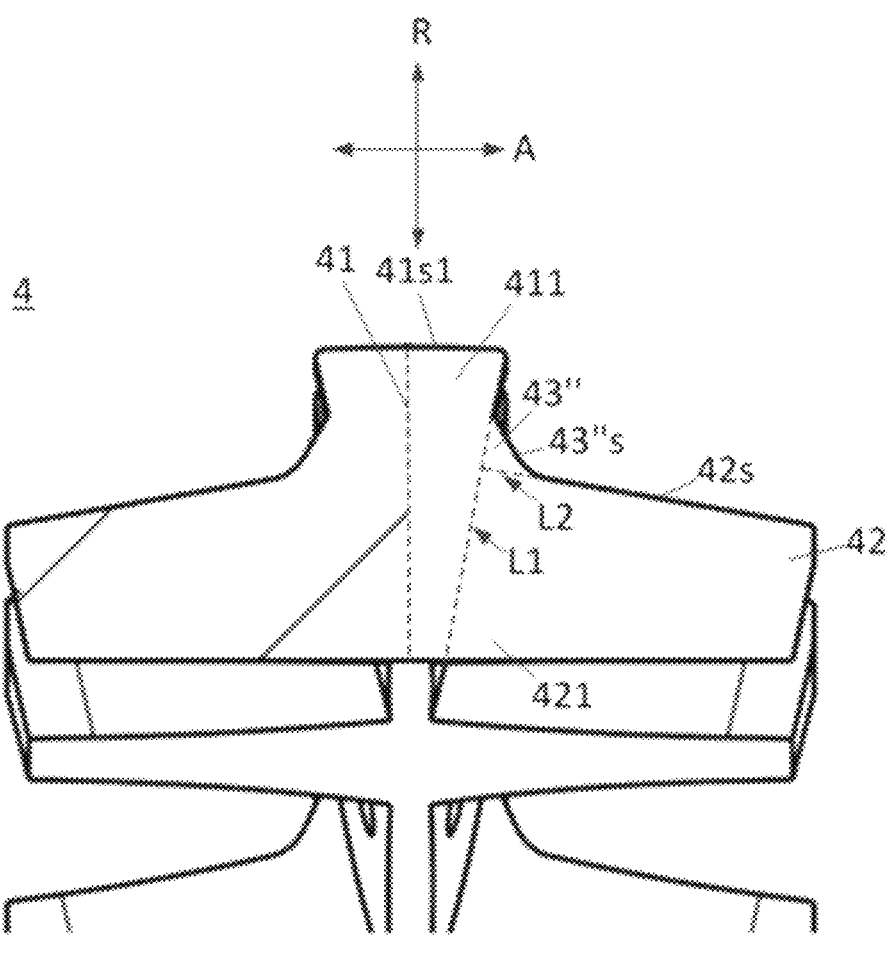
FIG. 4 is a partial cross-sectional schematic diagram of a holder of a self-aligning roller bearing according to a third embodiment of the present application. In this schematic diagram, for the convenience of explanation and understanding, part of a section line of a holder is omitted and all parts of the holder are divided by dotted lines.

As shown in FIG. 4, the outer surfaces 43"*s* of reinforcement parts 43" in the radial direction do not extend from outer circumferential surfaces 41*s*1 of protruding parts 411, but start to extend from approximate central positions of the outer side surfaces of the protruding parts 411 in the axial direction. In this way, the same technical effect as that of the reinforcement parts 43 in the first embodiment can also be achieved, and at the same time, it can be further ensured that the reinforcement part 43" will not make undesired contact with the rolling elements 3.

The structure of a self-aligning roller bearing according to a fourth embodiment of the present application will be described below with reference to the accompanying drawings.

The basic structure of the self-aligning roller bearing according to the fourth embodiment of the present application is roughly the same as the basic structure of the self-aligning roller bearing according to the first embodiment of the present application, and the differences between them will be described below.

Figure 5:
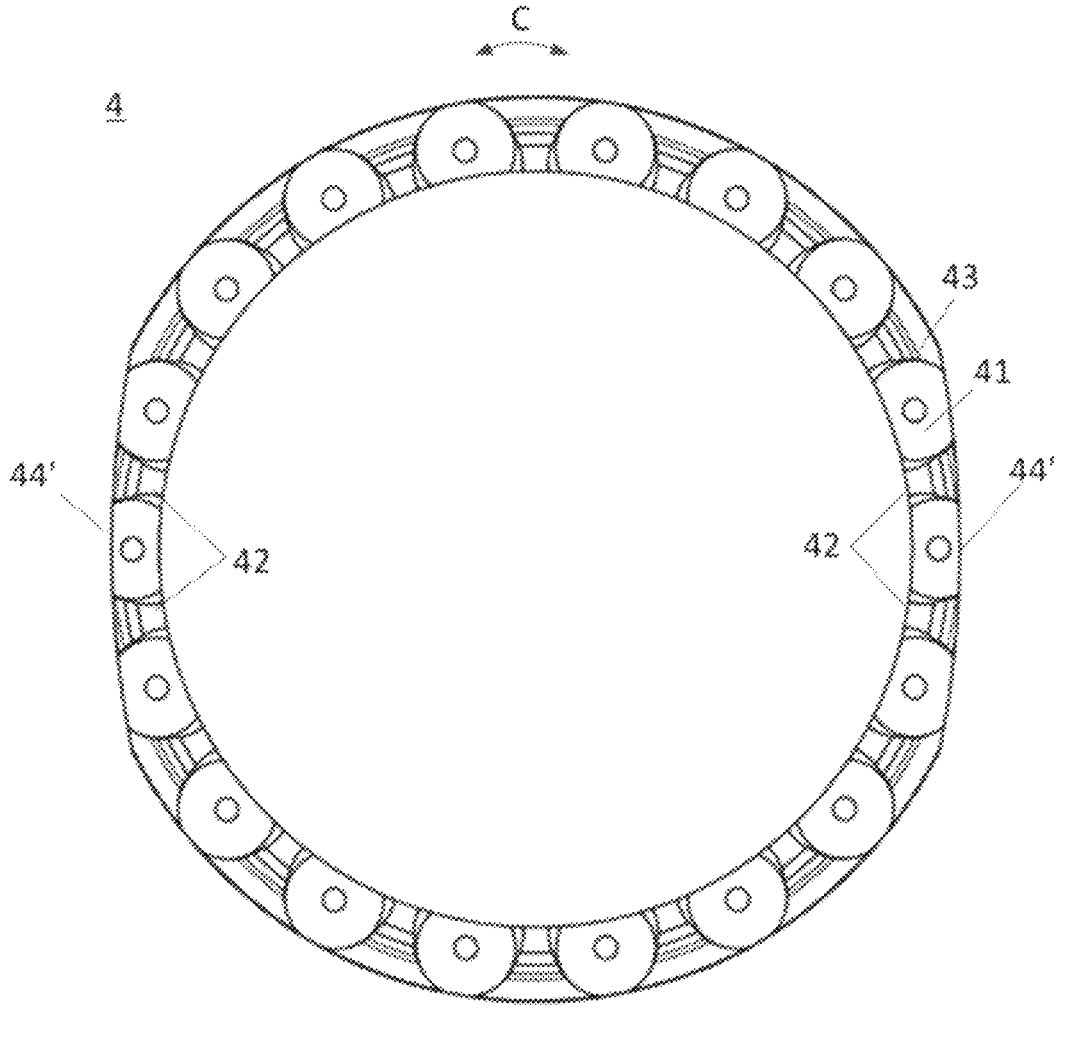
FIG. 5 is a schematic front view of a holder of a self-aligning roller bearing according to a fourth embodiment of the present application.

As shown in FIG. 5, in the front view of a holder 4 viewed along an axial direction A, contour lines of parts of the holder 4 where material removal sections 44' are formed are curves protruding toward the outer side. Compared with the material removal sections 44 of which the contour lines are the straight lines in the first embodiment, the material removal sections 44' in the present embodiment are more conducive to the installation of the self-aligning roller bearing.

Certainly, the present application is not limited to the above-mentioned embodiments, and those skilled in the art can make various modifications to the above-mentioned embodiments of the present application under the teaching of the present application without departing from the scope of the present application. For this purpose, the following explanations are also required.

i. It is not clearly stated in the background art that in fact, in an existing self-aligning roller bearing that uses an outer ring to guide a holder, at parts of the holder where no lintels are disposed, in cross sections cut out along the axial direction and radial direction, contour lines of the two side surfaces of a central annular part in the axial direction extend toward the inner side in the radial direction while extending toward the inner side in the axial direction, i.e., the side surfaces of the central annular part in the axial direction and end faces of rolling elements on the corresponding sides are parallel (see FIG. 2A). Correspondingly, to avoid possible interference with the rolling elements, no matter parts where the lintels are disposed or not, the two side surfaces of the protruding parts of the central annular part in the axial direction also have shapes extending toward the inner side in the radial direction while extending toward the inner side in the axial direction. Therefore, it should be understood that there are no such reinforcement parts 43, 43', 43" as described in the present application on both sides of the protruding parts of the central annular part of the existing self-aligning roller bearing. Compared with the prior art above, the reinforcement parts 43, 43', 43" of the present application obviously enhance the connection strength of connection parts between the lintels 42 and the central annular part 41.

For the solution of the present application, in order to clearly illustrate the structure and positions of the reinforcement parts 43 and 43" in FIG. 2A and FIG. 4, in the cross sections cut out along the axial direction A and the radial direction R, the structure of the holder 4 is divided by dotted lines L1 and L2 based on the descriptions above. Specifically, the dotted line L1 is a dotted line which is drawn from an endpoint of the outer side in the axial direction of a contour line of outer circumferential surfaces 41*s*1 of the holder 4 and is parallel to a contour line of end faces of the rolling elements 3; the portion of the holder 4 located closer to the inner side in the axial direction than the dotted line L1 is the central annular part 41; the dotted line L2 is an extended line drawn from the contour line of the outer side surfaces 42*s* of the lintels 42 in the radial direction toward the inner side in the axial direction, so the reinforcement parts 43, 43" are located on the outer side of the dotted line L1 in the axial direction and the outer side of the dotted line L2 in the radial direction. It can be understood that root parts 421 are portions of the lintels 42 that correspond to a length of the dotted line L2 and are located on the inner side of the dotted line L2 in the radial direction.

ii. Although it has been described in the above embodiments that the lintels 42 on two sides of the central annular part 41 in the axial direction are aligned in a circumferential direction C, the present application is not limited thereto. For example, the lintels 42 on the two sides of the central annular part 41 in the axial direction may also be arranged in a staggered mode in the circumferential direction C.

iii. Although it has been described in the above embodiments that centers of the material removal sections 44 are located between two lintels 42, the present application is not limited thereto. When the number of the lintels 42 is, for example, an odd number, the centers of the material removal sections may be located at parts aligned with the lintels 42.

In any one of the cross sections which are cut out along the radial direction of the rolling elements and are perpendicular to the axial direction of the rolling elements, suppose that a circle center of the cross sections of the rolling elements (3) is O, an outermost point of the contour line in the radial direction of the side surfaces of the lintels (42) in the circumferential direction is P and any point on the contour line of the circumferential side surfaces of the reinforcement parts (43, 43', 43") corresponding to the lintels (42) is Q, it is satisfied that a distance between point O and point Q is always greater than a distance between point O and point P.

iv. Although not explicitly described in the above embodiments, it should be understood that the holder in the present application may be made of, for example, metal such as brass or steel.

v. Although it is shown in the drawings corresponding to the above embodiments that concave parts are formed in centers of parts, corresponding to pockets, of the central annular part 41, which are generated during processing, it does not belong to the technical points in which the present application focuses.

DESCRIPTION OF REFERENCE NUMERALS

10 Outer Ring
20 Inner Ring
30 Rolling Element
40 Holder
1 Outer Ring
2 Inner Ring
3 Rolling Element
4 Holder
41 Central Annular Part
411 Protruding Part
41$s$1 Outer Circumferential Surface
41$s$2 Outer Side Surface In The Axial Direction
42 Lintel
421 Root Part
42$s$ Outer Side Surface In The Radial Direction
43, 43', 43" Reinforcement Part
43$s$, 43"$s$ Outer Side Surface In The Axial Direction
44, 44" Material Removal Sections
O Circle Center Of The Cross Sections Of The Rolling Elements
P Outermost Point Of The Contour Line In The Radial Direction Of The Side Surfaces Of The Lintels In The Circumferential Direction
Q Any Point On The Contour Line Of The Side Surfaces Of The Reinforcement Parts In The Circumferential Direction
A Axial Direction
R Radial Direction
C Circumferential Direction

The invention claimed is:

1. A holder for a self-aligning roller bearing, the holder has as a ring shape and comprises:
a central annular part;
a plurality of lintels fixed to the central annular part;
the central annular part extends continuously over an entire circumference along a circumferential direction of the holder;

each of the lintels extends by a predetermined length along an axial direction of the holder, and the lintels are fixed on two side surfaces of the central annular part in an axial direction;
on any side of the central annular part in the axial direction, the plurality of lintels are arranged at intervals in the circumferential direction to form pockets between adjacent ones of the lintels in the circumferential direction in which rolling elements of the self-aligning roller bearing are configured to be installed;
the central annular part comprises protruding parts which protrude to positions that are closer to outer sides in a radial direction of the holder than the lintels;
reinforcement parts fixed to the central annular part and the lintels, the reinforcement parts are located on outer sides of the lintels in the radial direction and are located on outer sides of the protruding parts in the axial direction;
at parts of the holder where the lintels are disposed, in cross sections cut out along the axial direction and radial direction, at least a part of a contour line of outer side surfaces of the reinforcement parts in the axial direction extends toward an inner side in the radial direction while extending toward an outer side in the axial direction;
wherein on an outer circumferential portion of the holder, two material removal sections are formed on the holder, the two material removal sections are deflected by 180 degrees relative to a circle center of the holder, and the two material removal sections are formed as curves on the outer circumferential portion.

2. The holder for the self-aligning roller bearing according to claim 1, wherein the contour line of the outer side surfaces in the axial direction extends from an outer circumferential surface of the central annular part to outer side surfaces of the lintels in the radial direction.

3. The holder for the self-aligning roller bearing according to claim 1, wherein along a path that the outer side surfaces extend in the axial direction from the lintels toward the central annular part, a width of the outer side surfaces in the axial direction increases in the circumferential direction.

4. The holder for the self-aligning roller bearing according to claim 1, wherein a number of the lintels on one side of the central annular part in the axial direction is equal to a number of the lintels on the other side of the central annular part in the axial direction, and the lintels on one side of the central annular part in the axial direction are aligned in the circumferential direction with the lintels on the other side of the central annular part in the axial direction.

5. The holder for the self-aligning roller bearing according to claim 1, wherein a center position of each of the material removal sections is located between two adjacent ones of the lintels in the circumferential direction.

6. The holder for the self-aligning roller bearing according to claim 1, wherein at the parts of the holder where the lintels are disposed, in cross sections which are cut out along the radial direction of rolling elements and are perpendicular to the axial direction of the rolling elements, contour lines of side surfaces of the reinforcement parts in the circumferential direction are straight lines or curves.

7. A self-aligning roller bearing, comprising the holder for a self-aligning roller bearing according to claim 1.

8. The self-aligning roller bearing according to claim 7, further comprising an outer ring, an inner ring and a plurality of rolling elements, the rolling elements are installed in pockets of the holder and are held between the outer ring and the inner ring by the holder, an outer circumferential surface of the central annular part of the holder is matched in shape with a raceway of the outer ring.

9. The self-aligning roller bearing according to claim 8, wherein the lintels and the reinforcement parts are configured so that the rolling elements only make contact with the lintels and are spaced apart from the reinforcement parts during use of the bearing.

10. The self-aligning roller bearing according to claim 7, wherein side surfaces of the lintels in the circumferential direction are formed with shapes matched with contours of the rolling elements.

11. A holder for a self-aligning roller bearing, the holder comprises:

a central annular part that extends in a circumferential direction;
  a plurality of lintels fixed to opposing axial side surfaces of the central annular part, each of the lintels extends a predetermined length in an axial direction;
  the plurality of lintels are arranged at intervals in the circumferential direction on each of the axial side surfaces to form pockets between adjacent ones of the lintels in the circumferential direction in which rolling elements are configured to be installed;
  the central annular part comprises protruding parts which protrude radially outwardly in a radial direction further than the lintels;
  reinforcement parts fixed to the central annular part and the lintels are located on outer sides of the lintels in the radial direction and are located on outer sides of the protruding parts in the axial direction;
  at parts of the holder where the lintels are disposed, in cross sections taken along the axial direction and radial direction, at least a part of a contour line of outer side surfaces of the reinforcement parts in the axial direction extends toward an inner side in the radial direction and also extends toward an outer side in the axial direction;
  wherein a number of the lintels on one side of the central annular part in the axial direction is equal to a number of the lintels on the other side of the central annular part in the axial direction, and the lintels on one side of the central annular part in the axial direction are aligned in the circumferential direction with the lintels on the other side of the central annular part in the axial direction; and wherein on an outer circumferential portion of the holder, two material removal sections are formed on the holder, and the two material removal sections are offset by 180 degrees in a circumferential direction, and a center position of each of the material removal sections is located between two adjacent ones of the lintels in the circumferential direction.

12. The holder for the self-aligning roller bearing according to claim 11, wherein the contour line of the outer side surfaces in the axial direction extends from an outer circumferential surface of the central annular part to outer side surfaces of the lintels in the radial direction.

13. The holder for the self-aligning roller bearing according to claim 11, wherein along a path that the outer side surfaces extend in the axial direction from the lintels toward the central annular part, a width of the outer side surfaces in the axial direction increases in the circumferential direction.

14. The holder for the self-aligning roller bearing according to claim 11, wherein in a front view viewed along an axial direction, contour lines of parts of the holder where the material removal sections are formed are straight lines or curves protruding toward the outer side in the radial direction.

15. The holder for the self-aligning roller bearing according to claim 11, wherein at the parts of the holder where the lintels are disposed, in cross sections which are cut out along the radial direction of rolling elements and are perpendicular to the axial direction of the rolling elements, contour lines of side surfaces of the reinforcement parts in the circumferential direction are straight lines or curves.

* * * * *